United States Patent [19]

Propp

[11] 4,048,070
[45] Sept. 13, 1977

[54] OIL AND WASTE WATER RECEPTION FACILITY AND PROCESS

[76] Inventor: Carl F. Propp, Rte. 2, Box 97, Estacada, Oreg. 97023

[21] Appl. No.: 692,283

[22] Filed: June 3, 1976

[51] Int. Cl.² .................. B01D 35/00; B01D 35/14
[52] U.S. Cl. .................... 210/85; 210/172;
  210/209; 210/261; 210/262; 210/263; 210/320;
  210/322; 210/522; 210/525; 210/DIG. 25
[58] Field of Search .............. 210/70, 71, 72, 73,
  210/84, 83, 172, 175, 187, 207, 242 S, 252, 253,
  257, 259, 260, 262, 322, 294, 513, 521, 522, 524,
  320, DIG. 25–DIG. 27, 525, 152, 153, 155, 167,
  85, 109, 209

[56] References Cited

U.S. PATENT DOCUMENTS

| | | | |
|---|---|---|---|
| 745,519 | 12/1903 | Pravicha et al. | 210/513 |
| 1,586,449 | 5/1926 | Jones | 210/73 OW |
| 1,612,557 | 12/1926 | Weisgerber | 210/187 |
| 1,614,074 | 1/1927 | Lenz et al. | 210/533 |
| 3,457,169 | 7/1969 | Schneider | 210/83 |
| 3,565,252 | 2/1971 | Sheehy et al. | 210/104 |
| 3,565,254 | 2/1971 | Latimer | 210/242 S |
| 3,616,917 | 11/1971 | Hellwege | 210/262 |
| 3,746,172 | 7/1973 | Nebolsine et al. | 210/253 |
| 3,844,944 | 10/1974 | Mercuri | 210/83 |
| 3,925,204 | 12/1975 | Cleysson et al. | 210/187 |
| 3,957,646 | 5/1976 | Wickert | 210/DIG. 25 |

Primary Examiner—Frank W. Lutter
Assistant Examiner—Frank Sever
Attorney, Agent, or Firm—Eugene M. Eckelman

[57] ABSTRACT

Decantation tanks receive an oil-water mixture from a holding tank. These decantation tanks are set at varying elevations and are arranged to operate in series to drain off oil that has separated out. These tanks may have heat producing elements associated therewith to increase the efficiency of oil separation, and chemicals may be employed in these tanks also to increase such efficiency if necessary. Separator tanks are also provided in the system and receive oil-water mixture from the bottom of the decantation tanks for further separation of oil from the water. These separator tanks have a skimming apparatus therein and also have a pair of baffles under which the water must travel to accomplish further separation of the oil. The separator tanks have a cross partition, and water in a main portion of the tank flows over such partition to a rear compartment from where it is directed to an open top inspection tank and filtered. The pH of the effluent may be altered at this point if necessary. The water upon discharge from the inspection tank is substantially oil free and is then directed into a waste water pond for disposal. The system employs an extensive manifold arrangement between the various elements for by-passing, recirculation, etc.

5 Claims, 4 Drawing Figures

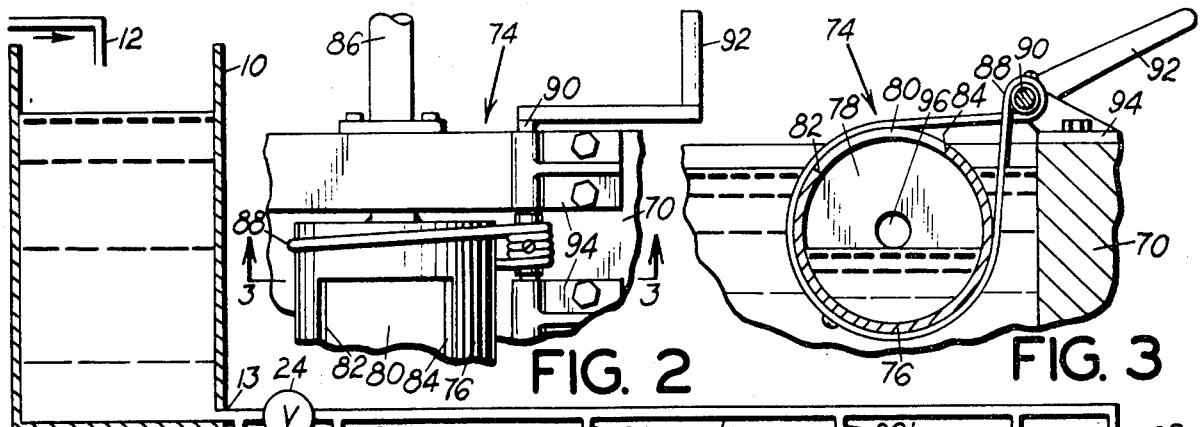
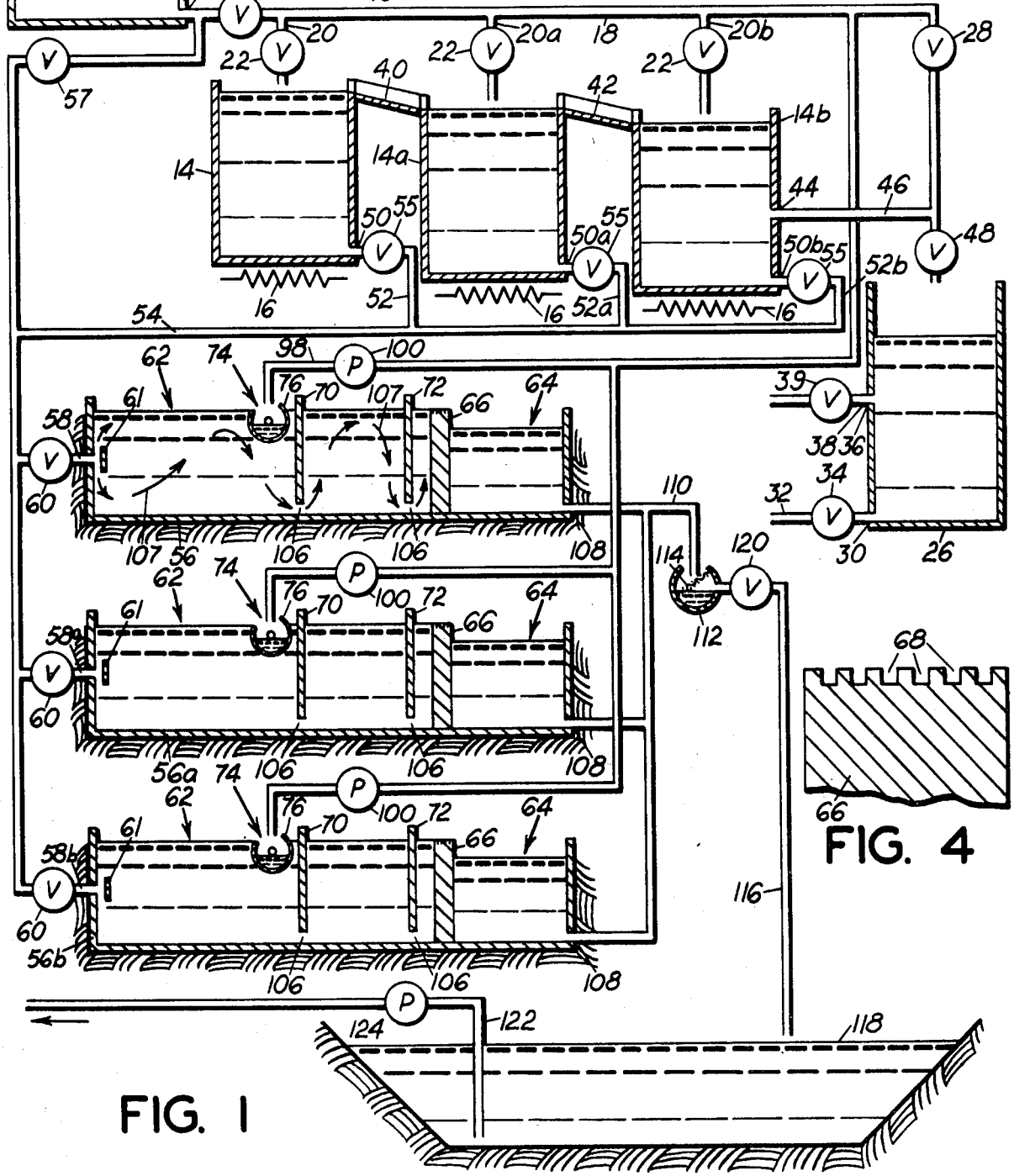

OIL AND WASTE WATER RECEPTION FACILITY AND PROCESS

BACKGROUND OF THE INVENTION

This invention relates to a new and novel oil and waste water reception facility and process.

Waste from oil ships has been a problem for a considerable time, both from an ecological and operational standpoint. It is not possible under present stringent regulations for ships to deposit bilge water, or other water that may contain oil into the ocean or other waterways. Thus, oil-water mixtures must be dispersed of on land. Such oil-water mixtures cannot be disposed of directly in public sewers or waterways in view of their oil content and furthermore the recovery value of the oil in the water is usually considerably small, thus not amounting to a desirable product for recovery processes. Since all ships have waste water that contains oil it is desirable for ports and docking facilities to provide means for receiving the waste water as an accommodation for the ships.

SUMMARY OF THE INVENTION

According to the present invention and forming a primary objective thereof, a system and process are employed that are particularly useful for receiving waste water from ships and for recovering the oil thereof, such system utilizing a minimum of exquisite refining equipment but at the same time treating the water so that it will be accepted by public sewage systems or dischargeable into waterways and so that an oil product is recovered therefrom that can be processed into a useful product.

The system utilizes an initial holding tank for the waste water received from ships, and this tank has an outlet for directing the water to one or more decantation tanks which may have heating means for cooking the waste water to increase the efficiency of oil and water separation. The decantation tanks are set at varying levels and are connected in series for concentrating the oil product to be collected. A lower portion of the tanks has outlet means leading to open top separator tanks. These separator tanks have pivotal skimming means and also have one or more baffles producing agitation of the water for further separating the oil. The separator tanks also have a partition over which water flows into a second tank portion from which the substantially oil free water is directed through a filter into an open top inspection tank. The pH of the effluent may be adjusted at the inspection tank. The inspection tank has an outlet for directing the substantially oil free water to disposal means such as a public sewer. The system employs manifold means for by-passing and recirculating if necessary.

BRIEF DESCRIPTION OF THE DRAWINGS

FIG. 1 is a diagrammatic view of apparatus for accomplishing concepts of the present invention;

FIG. 2 is a fragmentary plan view of skimming apparatus forming a part of the invention;

FIG. 3 is a fragmentary sectional view taken on the line 3—3 of FIG. 2; and

FIG. 4 is an enlarged fragmentary sectional view of a partition utilized in a separator tank of the invention.

DETAILED DESCRIPTION OF A PREFERRED EMBODIMENT

With particular reference first to FIG. 1, the numeral 10 designates a holding tank having infeed means 12 arranged to receive waste water from ships and deposit it in the tank 10. Such tank is arranged to receive a large supply of waste water and has an outlet 13 from which the waste water is fed to the recovery system at an operational rate depending upon the capacity of such recovery system.

A first stage in the recovery system comprises a series of decantation tanks 14, 14a, and 14b. Three of such tanks are shown in FIG. 1 but it is to be understood that more or fewer tanks may be used. These tanks are associated with heating means 16 provided for heating the contents thereof. Leading from outlet 13 is a conduit 18 or other liquid conveying member having branch lines 20, 20a and 20b leading to the respective decantation tanks. These branch lines have control valves 22 therein, and a valve 24 is also provided in the conduit 18 between the first branch line 20 and the folding tank 10. Conduit 18 also leads to an oil product tank 26 arranged to receive oil recovered from the system or directly from conduit 18. A valve 28 is disposed in the conduit 18 between the branch line 20b and the tank 26 for controlling flow to the latter tank through conduit 18. Tank 26 has an outlet 30 at the bottom thereof for discharging water which may be contained therein, a conduit 32 with a valve 34 therein communicating with such outlet. Conduit 32 leads back to the source, namely, to infeed means 12 for re-processing. Tank 26 also has an outlet 36 at an upper portion thereof communicating with a conduit 38 for discharging oil from the tank. A valve 39 in the conduit 38 controls such discharge of oil.

Decantation tanks 14, 14a, and 14b are set at varying elevations, with the tank 14 being higher than tank 14a and the latter tank being higher than tank 14b. An upper portion of first decantation tank 14 is in communication with an upper portion of tank 14a by means of a liquid conveying member 40 such as a trough, conduit or the like, such member being inclined downwardly to provide gravity flow from tank 14a. The latter tank in turn has an upper liquid conveying member 42 leading an inclined relation to an upper portion of tank 14b also for providing gravity flow. Tank 14b has an outlet 44 communicating with a liquid conveying member 46 which connects into conduit 18 on the downstream side of valve 28. A valve 48 is provided in conduit 18 between the connection of conduit 46 with conduit 18 and tank 26. By means of the structure thus far described it is apparent that an oil-water mixture from tank 10 can by suitable operation of valves be directed into one or a combination of tanks 14, 14a, and 14b, or if desired the contents of tank 10 can be admitted directly into tank 26, as will be described more fully hereinafter. Since the tanks 14, 14a and 14b are in series and arranged for gravity flow and since communication thereof is at their upper portion, the concentration of oil to water will increase from tank to tank and the outlet from the last tank may comprise substantially pure oil.

Heating of the oil-water mixture in the tanks 14, 14a, and 14b may be accomplished if necessary since such heating speeds up the separating process and also accomplishes more efficient separation. It has been found that a time of 6 to 8 hours at a temperature of 150° to 200° F. provides a good separation of oil from the water. Chemicals may be added to the oil-water mixture if necessary to speed or increase the efficiency of the oil-water separation.

Each of decantation tanks 14, 14a, and 14b has bottom outlets 50, 50a, and 50b, respectively, and these outlets communicate with individual liquid conveying means such as conduits 52, 52a, and 52b leading to a common conduit 54. Each of the individual conduits 52, 52a, and 52b has a control valve 55 therein.

Conduit 54 leads in one direction back to conduit 18 and is connected into the latter conduit at a point between tank 10 and valve 24. Conduit 54 has a control valve 57 therein disposed upstream toward conduit 18 and said conduit 54 also leads to one or more separator tanks 56. Three of such tanks are shown and identified by reference numerals 56, 56a and 56b. More or fewer of these separator tanks may be employed as necessary and are connected in parallel with the conduit 54 by means of branch conduits 58, 58a, and 58b, respectively. Each of these branch conduits has a control valve 60 therein.

Tanks 56, 56a, and 56b are of the same structure and employ an inner vertical impingement plate 61 adjacent the inlet of conduits 58 for separating the flow of water. These tanks have a pair of compartments 62 and 64 therein separated by a partition 66 the upper portion of which is shown in longitudinal section in FIG. 4. The top edges of partition 66 has transversely extending grooves 68 which as will be seen provide a rippling effect for water flowing thereover to further separate oil from the water as the water flows into compartment 64.

Front compartment 62 has a pair of baffles 70 and 72 therein and also a skimming unit 74 in front of baffles 70. A skimming unit is shown in detail in FIGS. 2 and 3 and skims oil which has separated from the water in the forward portion of the tank. Such skimming unit comprises a cylindrical container 76 having end walls 78 and having a longitudinal slot 80 defined by front and rear edges 82 and 84, respectively.

Container 76 is pivotally supported by end shafts 86 journaled in side walls of the separator tank and is positioned such that an upper portion thereof projects a short distance above the top of partition 66. Container 76 is pivotally adjustable on its end shafts by a line 88 extending therearound and wrapped on a shaft 90 in a winch arrangement. One end of shaft 90 has a turning handle 92, and such shaft is supported transversely on the tank by suitable journal brackets 94. By operation of the handle 92, the front edge 82 of the tank can be positioned at a level with the liquid in the tank portion 62 to skim off oil on the top of the water. The skimmed oil accumulates in the container 76, and an outlet or bore 96 is provided through one of the supporting shafts 86 and communicates with conduit 98 connected into conduit 18 downstream from the decantation tanks so that oil from the skimming unit 74 can be deposited in the oil product tank 26. Conduits 98 from all in the skimming units 74 are in communication with each other for directing the oil to the product tank 26, and each of these conduits has a pump 100 therein if necessary for forcing the oil to such tank.

Baffles 70 and 72 are disposed transversely in the tank and project above the surface of the water. They are longitudinally spaced, and the bottom ends thereof are disposed above the bottom of the tank to provide flow passageways 106. Instead of being spaced above the bottom of the tank the baffles may have apertures at their lower ends to provide such passageways. The flow of water through compartment 62 is shown by arrows 107 wherein it first is separated by plate 61, then after circulating in this compartment it flows under baffle 70 and then upward between the baffles, also in a circulatory movement. Thereupon the flow is under the second baffle 72 and then upwardly to the top of the partition 66 to flow into compartment 64.

As the water flows over the top of the partition 66, it ripples over the rib formed by the grooves 68 to further separate the oil from the water. The water flows into rear compartment 64 where any oil may be skimmed off by hand. From the compartment 64 the water flows through outlet 108 at the bottom of compartment 64 into a conduit 110. All of the outlets 108 from separator tanks 56, 56a and 56b are connected into the conduit 110.

Conduit 110 leads to an open top inspection tank 112 through a filter 114 such as a cloth filter having a mesh capable of catching particles of debris that may be carried in the water. Inspection of the water can be accomplished visually in the tank, and also the water can be treated as to its pH. If necessary, the pH is adjusted by chemicals such that the final water product meets the requirements for discharge into public sewer systems or waterways. A conduit 116 leads from tank 112 to a storage pond or a tank 118, and such conduit has a control valve 120 therein. Pond 118 has a suitable outlet conduit 112 with a pump 124 therein if necessary. The contents of pond 118 is disposed of in a public sewer system or other accepted disposal means.

In operation of the present system, waste water from a ship or the like is pumped into holding tank 10 for distribution into the system. In starting an oil-water separation process, the valves 57 and 28 will be closed. Valve 24 is open at this time. When using all the tanks 14, 14a, and 14b they are filled to a point below their upper outlets by suitable operation of their valves 22. After a suitable time of settling and suitable cooking if necessary, additional oil water mixture from tank 10 is admitted only to tank 14 by suitable operation of its valve 22, and with controlled fill of this tank, the upper separated out oil layer therein is caused to overflow into tank 14a through liquid conveying member 40. Such overflow will of course comprise a high concentration of oil to water mixture. This overflow in turn causes the oil layer on tank 14a to overflow into tank 14b which is even higher in concentration of oil to water mixture. The product in tank 14b comprises substantially pure oil. Valve 48 is opened to allow flow of oil into tank 26 whenever desired. The oil-water mixture from tank 10 may be run through all three decantation tanks as just described, but if desired such mixture may be run through only the last one or two tanks 14a and 14b as controlled by operation of valves 22 associated with all three tanks. Valves 56 associated with the outlet of the decantation tanks may be opened to allow the oil-water mixture at the bottoms of these tanks to flow to separator tanks 58, 58a, and 58b. If there is a very small concentration of oil in the initial waste, valve 24 may be shut and valve 57 opened to bypass the decantation tanks and run the initial product directly into the separator tanks 56, 56a, and 56b. Further yet, the water at the bottom of the decantation tanks can be recirculated back to the top of the tanks by closing valves 60 and opening valve 57. Or, too, if the product admitted to tank 10 is substantially pure oil, it can be made to flow directly to tank 26 from tank 10.

As the water flows through the separator tanks, whether received from decantation tanks or directly from tank 10, a further separation of oil therefrom takes place. That is, the water in flowing into compartments 62 is fanned out in its flow by engagement with the impingement plates 61 and such agitation as well as other circulation as shown by arrows 107 causes further separation of oil from the water. Such oil is skimmed off by skimming units 74. Thereupon, the water flows in circulating relation under the baffles 70 and 72 to further separate the oil and then it flows over the rippled top edge of partition 66 which causes an additional separating out of oil. This oil will float to the top of compartment 64 where it can be skimmed off manually.

The water product from the separator tanks flows into inspection tanks 112 where it is filtered through filter 114 and tested for its pH. If the pH must be adjusted to satisfy disposal regulations, a suitable acid or akaline may be added. From tank 112 the water is directed into pond 118 for its disposal.

The flow between tanks 14, 14a, and 14b is by gravity as described. Other portions of the system may also comprise gravity flow but if not, suitable pump means may be provided. For example, pumps 100 are shown in conduit 98 only but it is apparent that they may be provided elsewhere in the system where needed.

It is to be understood that the form of my invention herein shown and described is to be taken as a preferred form thereof and any changes in the shape, size and arrangement of parts may be resorted to without departing from the scope of the subjoined claims.

Having thus described my invention, I claim:

1. A system for recovering oil from an oil-water mixture and at the same time purifying the water sufficient to make it acceptable for deposit in disposal means, comprising
   a. a holding tank arranged to initially receive a supply of oil-water mixture,
   b. at least one decantation tank arranged to receive a mixture of oil and water from said holding tank and arranged to allow oil in the water to separate out and float to the top,
   c. liquid conveying means leading from an upper portion of said decantation tank arranged to discharge oil,
   d. a horizontal elongated separator tank open at the top and having inlet and outlets ends,
   e. liquid conveying means leading from a lower portion of said decantation tank to the inlet end of said separator tank for directing water from said decantation tank to said separator tank to allow further settling out of oil that may remain in the water,
   f. liquid conveying means leading directly from said holding tank to said separator tank,
   g. control means associated with said latter liquid conveying means arranged to direct the flow of oil-water mixture to either of said decantation tank or said separator tank,
   h. oil skimming means at an upper portion of said separator tank located between said inlet and outlets ends,
   i. liquid conveying means leading from said skimming means for discharging oil that has separated in said separator tank,
   j. circulating means in said separator tank for agitating the mixture of oil and water, comprising an upright partition in said tank on the outlet side of said skimming means, forming a second tank portion open at the top, said partition having a top edge forming a weir over which water spills to said second tank portion, said top edge having groove means therein extending transversely of said tank; said groove means functioning to produce a rippling effect in the liquid flowing thereover so as to further separate oil from water in said liquid,
   k. an open top inspection tank,
   l. liquid conveying means leading from the outlet of said separator tank to said inspection tank,
   m. storage means having an outlet for the treated water,
   n. liquid conveying means leading from said inspection tank to said storage means,
   o. and oil storage means arranged to receive oil from said decantation tank and from said skimming means.

2. The recovery system of claim 1 wherein said circulating means includes an upright transverse baffle in said separator tank on the outlet side relative to said skimming means, said baffle extending above the fluid level in said separator tank, means defining a fluid path adjacent the lower end of said baffle whereby water in flowing to the outlet of said separator tank must circulate down and then upward at said baffle.

3. The recovery system of claim 2 wherein said circulating means includes at least two of said upright transverse baffles.

4. The recovery system of claim 1 wherein said oil skimming means comprise a transverse cylindrical member pivotally supported on said tank, said tubular member having a longitudinal cut-out section defined by forward and rearward longitudinal edges, said forward edge comprising a weir over which oil is arranged to flow into said cylindrical member upon selected pivoted positioning of the latter, and liquid conveying means associated with said cylindrical member arranged to discharge oil therefrom.

5. A system for recovering oil from an oil-water mixture and at the same time purifying the water sufficient to make it acceptable for deposit in disposal means, comprising
   a. at least one decantation tank arranged to receive a mixture of oil and water and arranged to allow oil in the water to separate out and float to the top,
   b. liquid conveying means leading from an upper portion of said decantation tank arranged to discharge oil,
   c. a horizontal elongated separator tank open at the top and having inlet and outlet ends.
   d. liquid conveying means leading from a lower portion of said decantation tank to the inlet end of said separator tank for directing water from said decantation tank to said separator tank to allow further settling out of oil that may remain in the water,
   e. oil skimming means at an upper portion of said separator tank located between said inlet and outlet ends,
   f. liquid conveying means leading from said skimming means for discharging oil that has separated in said separator tank,
   g. at least two upright transverse baffles in said separator tank on the outlet side relative to said skimming means, said baffles extending above the fluid level in said separator tank,
   h. means defining a fluid path adjacent the lower end of said baffles whereby water in flowing between the inlet and outlet of said separator tank must circulate down and then upward at said baffles, j. an upright partition in said tank on the outlet side of said baffles forming a second tank portion open at the top, said partition having a top edge forming a weir over which water spills to said second tank portion, j. said top edge having groove means therein extending transversely of said tank ; said groove means functioning to produce a rippling effect in liquid flowing thereover so as to further separate oil from water in said liquid, k. an open top inspection tank, l. conveying means leading from said separator tank to said inspection tank, m. storage means having an outlet for the treated water, n. liquid conveying means leading from said inspection tank to said storage means, o. and oil storage means arranged to receive oil from said decantation tank and from said skimming means.

* * * * *